US010066578B2

(12) United States Patent
Schleif et al.

(10) Patent No.: US 10,066,578 B2
(45) Date of Patent: Sep. 4, 2018

(54) SLIDING ARRANGEMENT AND METHOD FOR PRODUCING THE SLIDING ARRANGEMENT, IN PARTICULAR FOR A CYLINDER LINER

(71) Applicant: Bayerische Motoren Werke Aktiengesellschaft, Munich (DE)

(72) Inventors: Beate Schleif, Munich (DE); Wolfram Wagener, Geisenhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 105 days.

(21) Appl. No.: 15/355,136

(22) Filed: Nov. 18, 2016

(65) Prior Publication Data

US 2017/0067410 A1   Mar. 9, 2017

Related U.S. Application Data

(63) Continuation of application No. PCT/EP2015/054997, filed on Mar. 11, 2015.

(30) Foreign Application Priority Data

May 20, 2014   (DE) ................. 10 2014 209 522

(51) Int. Cl.
*F02F 1/00*   (2006.01)
*C23C 4/08*   (2016.01)
(Continued)

(52) U.S. Cl.
CPC ............. *F02F 1/004* (2013.01); *C23C 4/08* (2013.01); *C23C 4/131* (2016.01); *C23C 4/134* (2016.01);
(Continued)

(58) Field of Classification Search
CPC ... F02F 1/004; F16C 2204/60; F16C 2204/20; C23C 4/08; C23C 4/131; C23C 4/134; C23C 24/04
(Continued)

(56) References Cited

U.S. PATENT DOCUMENTS 5,363,821 A * 11/1994 Rao ..................... C10M 111/04
                                                          123/193.2
5,592,927 A *  1/1997 Zaluzec ..................... F02F 1/20
                                                          123/668
(Continued)

FOREIGN PATENT DOCUMENTS

CN      1387586 A    12/2002
DE      876 788 B     5/1953
(Continued)

OTHER PUBLICATIONS

International Search Report (PCT/ISA/210) issued in PCT Application No. PCT/EP2015/054997 dated May 26, 2015 with English translation (five pages).
(Continued)

*Primary Examiner* — Marguerite McMahon
(74) *Attorney, Agent, or Firm* — Crowell & Moring LLP

(57) ABSTRACT

A sliding arrangement has a main body, in particular a crankcase, made from an aluminum material, and a coating which is applied to the main body by way of thermal spraying as a sliding surface, in particular as a cylinder liner. The sliding surface has a first phase consisting of a first material and a second phase consisting of a second material. The first material is different from the second material. The first material has at least 50 percent by mass of iron, and wherein the second material has at least 50 percent by mass of copper.

20 Claims, 1 Drawing Sheet

(51) Int. Cl.
*C23C 4/131* (2016.01)
*C23C 4/134* (2016.01)
*C23C 24/04* (2006.01)

(52) U.S. Cl.
CPC .......... *C23C 24/04* (2013.01); *F16C 2204/20* (2013.01); *F16C 2204/60* (2013.01)

(58) Field of Classification Search
USPC .................................. 123/193.2; 29/888.061
See application file for complete search history.

(56) References Cited

U.S. PATENT DOCUMENTS

| | | | | |
|---|---|---|---|---|
| 5,766,693 | A | * | 6/1998 | Rao ........................... C23C 4/06 427/453 |
| 5,820,938 | A | * | 10/1998 | Pank ......................... C23C 2/02 427/449 |
| 6,254,699 | B1 | | 7/2001 | Hermanek |
| 6,345,440 | B1 | * | 2/2002 | Van Reatherford .... C23C 4/185 29/527.2 |
| 2003/0192501 | A1 | * | 10/2003 | Ishikawa .................. F02F 1/20 123/193.2 |
| 2006/0063020 | A1 | | 3/2006 | Barbezat |
| 2013/0181409 | A1 | | 7/2013 | Kennedy et al. |

FOREIGN PATENT DOCUMENTS

| | | |
|---|---|---|
| DE | 24 13 097 A1 | 10/1974 |
| DE | 199 56 622 A1 | 5/2000 |
| EP | 1 036 857 A1 | 9/2000 |
| EP | 1 637 621 B1 | 5/2008 |
| GB | 1441961 A | 7/1976 |
| JP | 56-96066 A | 8/1981 |
| JP | 58-113368 A | 7/1983 |
| JP | 6-25821 A | 2/1994 |
| WO | WO 2012/010376 A1 | 1/2012 |

OTHER PUBLICATIONS

German-language Written Opinion (PCT/ISA/237) ) issued in PCT Application No. PCT/EP2015/054997 dated May 26, 2015 (five pages).

German Search Report issued in counterpart German Application No. 10 2014 209 522.0 dated Sep. 25, 2014 with partial English translation (10 pages).

Chinese-language Office Action issued in counterpart Chinese Application No. 201580008752.5 dated Jan. 24, 2018 with English translation (fourteen (14) pages).

* cited by examiner

SLIDING ARRANGEMENT AND METHOD FOR PRODUCING THE SLIDING ARRANGEMENT, IN PARTICULAR FOR A CYLINDER LINER

CROSS REFERENCE TO RELATED APPLICATIONS

This application is a continuation of PCT International Application No. PCT/EP2015/054997, filed Mar. 11, 2015, which claims priority under 35 U.S.C. § 119 from German Patent Application No. 10 2014 209 522.0, filed May 20, 2014, the entire disclosures of which are herein expressly incorporated by reference.

BACKGROUND AND SUMMARY OF THE INVENTION

The invention relates to a sliding arrangement and to a method for producing the sliding arrangement, particularly for a cylinder liner in an internal-combustion engine. The invention further relates to the internal-combustion engine having the sliding arrangement.

According to the state of the art, thermally sprayed sliding surfaces, such as cylinder liners in aluminum crankcases, are known. Iron-based coatings are preferably applied for the serial production. For optimizing the properties, specifically friction, wear and emergency running properties, various alloy elements or particles can be placed in the layer in a targeted manner.

It is an object of the present invention to provide a sliding arrangement and a method for producing a sliding arrangement, particularly for a cylinder liner in an internal-combustion engine, which, while their production is cost-effective, make it possible to obtain a lastingly strong sliding surface, in which case particularly various properties, such as low friction, low wear and good emergency running properties of the sliding surfaces are to be obtained. It is a further object of the invention to provide a corresponding internal-combustion engine having the sliding arrangement.

This and other objects are therefore achieved by a sliding arrangement comprising a main body, particularly a crankcase made of an aluminum material, and a coating that is applied to the main body by thermal spraying, as the sliding surface, particular as a cylinder liner. The sliding surface comprises a first phase made of a first material and a second phase made of a second material. The first material is different from the second material. The first material comprises at least 50 percent by mass iron (Fe), and the second material comprises at least 50 percent by mass copper (Cu).

The first phase of the sliding surface therefore consists of an iron-based alloy, particularly a non-alloy or low-alloy steel being used. The second phase consists of a copper-based material, particularly aluminum bronze. The two starting materials are not completely alloyed together in the sliding surface, but the two materials recur at least partially as separate phases. In particular, a larger amount of the first material is used than of the second material, so that the first material, particularly steel, forms the matrix, the second phase consisting of the second material, particularly bronze, being embedded in this matrix. Steel has the advantage that, while its strength is high and its thermal conductivity is good, it has very low wear. By means of the first material or the first phase in the sliding surface, a high load can therefore be absorbed, while the wear resistance is good. The second phase, essentially consisting of copper, is used for reducing the friction of the sliding surface.

Advantageously, bronze with at least 70 percent by mass copper (Cu) and at least one further alloying element, including aluminum (Al), is used as the second material.

A ratio of the first material to the second material, particularly in the starting material, preferably is between 60:40 and 95:5 (first material:second material). This results in a first phase, preferably containing iron, for forming the matrix. The second phase, preferably containing copper, is embedded in this first phase.

The invention further comprises a method for producing a sliding arrangement, particularly the above-mentioned sliding arrangement. The method is preferably applied to cylinder liners in an internal-combustion engine. The method comprises at least the following acts: (i) providing a main body, preferably a crankcase of the internal-combustion engine. The main body consists of an aluminum material, preferably of an aluminum alloy; (ii) thermal spraying of a coating onto the main body. This thermally sprayed-on coating represents the sliding surface, preferably after a suitable mechanical process, particularly honing. An activation of the surface to be coated preferably takes place before the coating. At least two different materials are used for the thermal spraying. In this case, a simultaneous thermal spraying of these two materials takes place. The two materials may also be called spraying materials. They are fed to the spraying process, for example, as two wires or as one coated wire. However, during the feeding to the thermal spraying process, the at least two materials may even be alloyed with one another, the temperature for the spraying then being selected correspondingly, so that the alloy will only be partially melted, and the two phases will occur in the coating.

As a result of the simultaneous thermal spraying of the two materials, the sliding surface is created of two phases, the first phase consisting of an iron-based alloy, particularly an unalloyed or a low-alloyed steel, and the second phase consisting of a copper-based material, particularly aluminum bronze By means of the thermal spraying process, the two starting materials are not completely alloyed together, or if the materials are present in an alloy before the thermal spraying, this alloy is at least partially separated during the thermal spraying. In both cases, the two materials will recur at least partially as separate phases in the coating or sliding surface. In particular, a larger amount of the first material is used than of the second material, so that the first material, particularly steel, forms the matrix, the second phase consisting of the second material, particularly bronze, being embedded in this matrix. As a result of this production of the coating according to the invention, very different properties of the sliding surface can be implemented, depending on the selection of the materials. Within the scope of the method according to the invention, the same materials and mass ratios of the materials are provided as in the case of the sliding surface according to the invention.

Advantageously, plasma spraying, high-velocity oxygen fuel spraying, wire arc spraying or cold-gas spraying is used as the thermal spraying process.

A powder is normally used for the plasma spraying and for the cold-gas spraying. In the process described here, two different powders of the different materials are correspondingly fed simultaneously to the plasma spraying process.

During high-velocity oxygen fuel spraying, either powder or a wire can be used. When powder is used, again two different types of powder of the different materials are used.

During wire arc spraying, wires, particularly two, three or four wires are used. The two materials are correspondingly fed here in the form of a wire.

For the wire arc spraying as well as for the high-velocity oxygen fuel spraying, two different preferred variants exist for the use of the wires: On the one hand, a first wire of the first material and simultaneously a second wire of the second material can be fed. Furthermore, it is preferably provided that a single wire is used, in which case the core of the wire consists of the second material and a jacket of the core of the wire consists of the first material. As a result, it becomes possible to feed the two materials in the form of only one wire simultaneously to the thermal spraying process.

Experiments with the different processes for the thermal spraying have demonstrated that, when appropriate process parameters are set, the two materials do not completely alloy through during thermal spraying but are at least partially present as two different phases in the coating. This is easily visible in microsections.

The invention further comprises an internal-combustion engine with the described sliding surface as the cylinder liner. It is further advantageously provided to produce the internal-combustion engine according to the invention with the described sliding surface according to the above-described method.

By means of the invention, the high resistance to wear of the first material and the low friction of the second material can be simultaneously used in a sliding surface. Despite the resistance to wear, this reduces the friction in the internal-combustion engine, whereby the fuel consumption and the $CO_2$ emission will be reduced.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
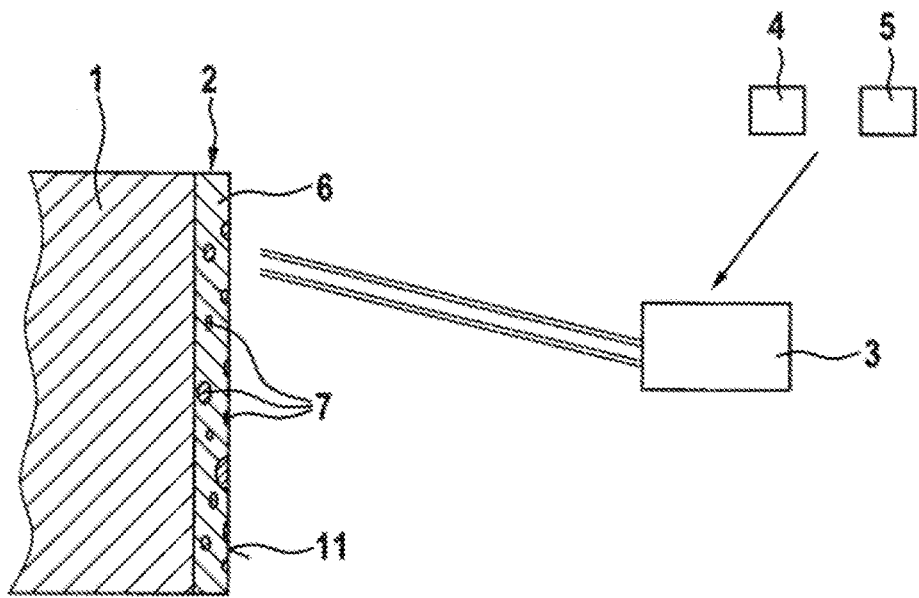
FIG. 1 is a schematic view of an exemplary sliding arrangement according to the invention and of an exemplary method according to the invention.
Figure 2:
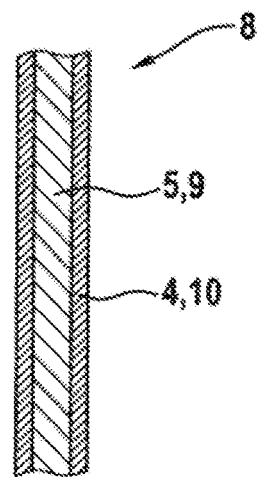
FIG. 2 is a view of a wire that can be used in the exemplary method according to the invention.

By means of FIGS. 1 and 2, a sliding arrangement having a sliding surface 11 and a method for producing a sliding arrangement 11 are described.

FIG. 1 is a schematic, very simplified view of a cutout of a main body 1, designed here as an aluminum crankcase. A coating 2 is applied to the main body 1 by thermal spraying. After mechanical processing, the exterior of the coating 2 will form the sliding surface 11 that is used here as a cylinder liner.

A thermal spraying device 3 is used for the thermal spraying process. In particular, the thermal spraying device 3 is a device for plasma spraying, high-velocity oxygen fuel spraying, wire arc spraying or cold-gas spraying.

A first material 4 and a second material 5 are simultaneously fed to the thermal spraying device 3. The first material 4 consists essentially of steel or iron. The second material 5 comprises a considerable proportion of copper.

By means of the thermal spraying process, the two materials 4, 5 are simultaneously applied to the main body 1, so that the coating 2 is created.

As shown by the schematic representation in FIG. 1, a first phase 6 originates from the first material 4. A second phase 7, which is embedded in the first phase 6, originates from the second material 5.

A wire 8 according to FIG. 2 can be used particularly for the wire arc spraying or for the high-velocity oxygen fuel spraying. The wire 8 has a core 9 made of the second material 5. The core 9 is surrounded by a jacket 10 made of the first material 4. By means of the illustrated wire 8, the two materials 4, 5 can simultaneously be fed to the thermal spraying device 3.

LIST OF REFERENCE NUMBERS

1 Main body
2 Coating
3 Thermal spraying device
4 First material (steel)
5 Second material (bronze)
6 First phase (matrix)
7 Second phase (embedding)
8 Wire
9 Core
10 Jacket
11 Sliding surface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sliding arrangement, comprising:
   a main body;
   a thermally sprayed coating on the main body, the coating forming a sliding surface, wherein
   the sliding surface comprises a first phase made of a first material and a second phase made of a second material,
   the first material differs from the second material, and
   the first material comprises at least 50 percent mass iron and the second material comprises at least 50 percent mass copper.

2. The sliding arrangement according to claim 1, wherein the main body is an aluminum crankcase and the coating forms a cylinder liner of the crankcase.

3. The sliding arrangement according to claim 2, wherein the first material comprises at least 70 percent mass iron.

4. The sliding arrangement according to claim 3, wherein the second material comprises at least 70 percent mass copper.

5. The sliding arrangement according to claim 2, wherein the second material comprises at least 70 percent mass copper.

6. The sliding arrangement according to claim 4, wherein the second material is bronze having the at least 70 percent mass copper and at least one additional alloy element.

7. The sliding arrangement according to claim 6, wherein the at least one additional alloy element is aluminum.

8. The sliding arrangement according to claim 1, wherein a ratio of the first material to the second material is between 60:40 and 95:5.

9. The sliding arrangement according to claim 7, wherein a ratio of the first material to the second material is between 60:40 and 95:5.

10. An internal combustion engine, comprising:
    a crankcase;
    a cylinder liner of the crankcase, wherein
    the cylinder liner has a thermally spray coated sliding surface, the sliding surface comprises a first phase made of a first material and a second phase made of a second material, the first material differs from the second material, and the first material comprises at least 50 percent mass iron and the second material comprises at least 50 percent mass copper.

11. The internal combustion engine according to claim 10, wherein the first material comprises at least 70 percent mass iron and the second material comprises at least 70 percent mass copper.

12. The internal combustion engine according to claim 11, wherein the second material is bronze having the at least 70 percent mass copper and an additional alloy element.

13. The internal combustion engine according to claim 12, wherein a ratio of the first material to the second material is between 60:40 and 95:5.

14. A method of producing a sliding arrangement, the method comprising the acts of:
providing a main body made of an aluminum material;
thermally spraying a coating onto the main body to produce a sliding surface, wherein
a first material and a second material differing from the first material are simultaneously applied in a thermal spraying process so that the sliding surface has a first phase of the first material and a second phase of the second material,
the first material comprises at least 50 percent mass iron and the second material comprises at least 50 percent mass copper.

15. The method according to claim 14, wherein the main body is a crankcase and the sliding surface forms a cylinder liner for the crankcase.

16. The method according to claim 15, wherein the first material comprises at least 70 percent mass iron and the second material comprises at least 70 percent mass copper.

17. The method according to claim 14, wherein the thermal spraying process is a wire arc spraying process in which the first and second materials are simultaneously fed as wire.

18. The method according to claim 17, wherein a core of the wire is made of the second material and a jacket for the core of the wire is made of the first material.

19. The method according to claim 14, wherein the thermal spraying process provides a ratio of the first material to the second material between 60:40 and 95:5.

20. The method according to claim 16, wherein the second material is bronze having the at least 70 percent mass copper and an additional alloy in the form of aluminum.

* * * * *